United States Patent Office 3,551,366
Patented Dec. 29, 1970

3,551,366
AUXILIARY AGENTS FOR THE DISPERSION POLYMERIZATION OF VINYL ESTERS
Joachim Galinke and Miklos Danielisz, Dusseldorf-Holthausen, Germany, assignors to Henkel & Cie. G.m.b.H., Dusseldorf-Holthausen, Germany, a corporation of Germany
No Drawing. Filed Sept. 30, 1966, Ser. No. 583,438
Claims priority, application Germany, Nov. 11, 1965, H 57,647
Int. Cl. C08f 1/13, 3/56
U.S. Cl. 260—17.4        5 Claims

ABSTRACT OF THE DISCLOSURE

The present invention relates to use of water-soluble auxiliary agents, particularly hydroxyalkyl ethers of galactomannans, together with polyvinyl alcohol, for the dispersion polymerization of vinyl esters of alkanoic acids having from 2 to 4 carbon atoms, in particular of vinyl acetate in aqueous phase.

THE PRIOR ART

It is known, to add water-soluble hydroxyethylated polypropylene oxides or nitrogen atom-containing polyalkylene glycols as auxiliary agents in the dispersion polymerization of vinyl esters. By using those non-ionic wetting agents, dispersions of large particle size and of good resistance to freezing are obtained. The wet-wiping resistance and the surface gloss of the films produced from these polymers are satisfactory. However, the auxiliary agents named above have to be used in relatively large amounts, up to about 10% for the monomers. In the cases cited, the polymerization is advantageously conducted in the presence of alkali metal salts of vinylsulfonic acid, which salts are incorporated in the polymerizate. However, because of the incorporation of these hydrophilic groups, the film formed from latex can be affected unfavorably in regard to its re-emulsifiability.

OBJECTS OF THE INVENTION

The present invention has the basic objective of obtaining stable polyvinyl ester dispersions with a wide variation regarding the size of the latex particles, by utilizing a novel auxiliary agent acting as emulsifier or protective colloid, of which only a relatively small amount has to be used.

Another object of the invention is the obtention of stable polyvinyl ester dispersions containing hydroxylower-alkyl ether of galactomannans as emulsifiers or protective colloids.

A further object of the invention is the development in the process for dispersion polymerization of vinyl monomers containing at least 90% of vinyl esters of alkanoic acids having from 2 to 4 carbon atoms which comprises reacting an aqueous dispersion of said vinyl monomers in the presence of protective colloids with a free-radical polymerization catalyst under polymerization conditions and recovering an aqueous dispersion of polyvinyl esters of alkanoic acids having from 2 to 4 carbon atoms, of the improvement which comprises conducting said reacting step in the presence of hydroxy-lower-alkyl ethers of galactomannans.

These and other objects of the invention will become more apparent as the description thereof proceeds.

DESCRIPTION OF THE INVENTION

The invention relates to the discovery that, for the polymerization of vinyl esters of mono-basic, aliphatic, monocarboxylic acids containing from 2 to 4 carbon atoms in aqueous phase, hydroxy-lower-alkyl ethers of naturally-occurring galactomannans are used as auxiliary agents. According to the invention, in particular, hydroxyethyl ethers or hydroxypropyl ethers of galactomannans are used. Of course, also mixtures of hydroxy-lower-alkyl ethers can be used or even those, which are obtained by the addition of various lower-alkylene oxides to galactomannans.

The hydoxry-lower-alkyl ethers of galactomannans, to be utilized according to the invention, are known or are prepared according to known methods. In particular, hydroxyethyl and hydroxypropyl ethers have already been known for some time.

For the preparation of the hydroxy-lower-alkyl ethers of galactomannans, for example, guar flour or locust bean flour (carubin) are dissolved or dispersed in dilute aqueous sodium hydroxide and admixed with lower alkylene oxides, in particular ethylene oxide or propylene oxide. The reaction mixture can be worked up after some time following the neutralization of the alkali and after the evaporation thereof. The hydroxyethyl ether of guar flour can also be prepared by treating alkalized guar flour with ethylene chlorohydrin.

Particularly suitable for the utilization according to the invention are the especially purified hydroxy ethyl or hydroxypropyl ethers of galactomannans or those which, in virtue of the preparation method, precipitate with particular purity. These pure products can be obtained for example, according to the copending, commonly assigned United States patent application Ser. No. 419,599, filed Dec. 18, 1964, now Patent No. 3,326,890, by treating guar or locust bean flour with ethylene oxide or propylene oxide in a mixture of a water-miscible organic solvent and water, using for this purpose amines and/or quaternary ammonium bases as catalysts. The reaction is effected at temperatures between 30° and 80° C. The water-miscible, organic solvents are for example, isopropanol, secondary butanol, secondary amyl alcohols, tertiary butanol, acetone, methylethyl ketone and dioxane. The reaction mixture is worked up by filtration and, if so desired, by neutralization of still present traces of alkaline reacting catalysts. These hydroxyethyl ethers of galactomannans display, according to the origin of the galactomannans and to the degree of the substitution and degradation, a viscosity of about 200 to 4000 cp. in 2% aqueous solution.

The amount of the hydroxy-lower-alkyl ethers of galactomannans to be used depends on their properties and it generally amounts to 0.2 to 1.5%, particularly 0.4 to 1.0% by weight, based on the total weight of the polymerization mixture (including water). Within certain limits, this amount depends on the viscosity of the aqueous solutions of the hydroxy-lower-alkyl ethers of the galactomannans. As a rule, for highly viscous products a smaller amount is required than for the less viscous products.

According to the present invention, hydroxy-lower-alkyl ethers of the naturally-occurring galactomannans can be used for the dispersion-polymerization of vinyl esters of alkanoic acids having from 2 to 4 carbon atoms, such as vinyl proponiate, vinyl butyrate, in particular vinyl acetate. Of course, the esters mentioned can also be polymerized as a mixture.

In addition to the compounds named above, other polymerizable compounds can be added, in minor amounts up to about 10% of the vinyl esters of alkanoic acids having from 2 to 4 carbon atoms, to the polymerization mixture. Such vinyl monomers are, for example, long-chain vinyl esters, as for example vinyl higher alkanoates such as vinyl laurate, vinyl stearate; vinyl benzoate, or acrylic acid esters with alkanols such as ethyl acrylate, butyl acrylate, 2-ethyl-hexyl acrylate; or methacrylic acid esters with alkanols such as butyl methacrylate ester; maleic acid esters of alkanols such as dimethyl maleate, dibutyl maleate; or fumaric acid ester of alkanols, such as diethyl fumarate, dipropyl fumarate; or itaconic acid esters of alkanols such as dimethyl itaconate. Furthermore, alkyl esters of dicarboxylic acids such as diallyl phthalate, diallyl maleate; or vinyl halides such as vinyl chloride, vinylidene chloride; or vinyl benzenes such as styrene, methylstyrene, monochlorostyrene, divinylbenzene; or triallylamine can be added in small amounts to the polymerization mixture. It is also possible to copolymerize polymerizable olefinically unsaturated compounds, containing free carboxyl groups or OH-groups, for example crotonic acid, acrylic acid or methacrylic acid, maleic acid semi-ester such as monomethyl maleate, monobutyl maleate, or unsaturated alcohols such as allylalcohol, oleylalcohol and others. Of those compounds containing several polymerizable double bonds in the molecule, as a rule not more than 0.5%, in particular 0.05 to 0.2% is added, based on the weight of the vinyl esters of alkanoic acids having from 2 to 4 carbon atoms.

The polymerization itself is accomplished according to known methods.

Advantageously, the water used for the preparation of the dispersion should be free of disturbing ions and oxygen. The proportion between the monomers and water is generally adjusted so that, after the polymerization is completed, about 30 to 60%, particularly 45 to 55% dispersion of the polymerizate is obtained.

In addition to the hydroxy-lower-alkyl ethers of galactomannans, small amounts of protective colloids such as polyvinylalcohol or the like can be used.

The polymerization is accomplished under stirring, generally at temperatures of about 10° to 100° C., particularly 50° to 80° C., and is initiated by means of known polymerization initiators. For example, for this purpose the following may be utilized; potassium persulfate, hydrogen peroxide, if so desired with an addition of reducing agents such as sodium sulfite, sodium dithionite, sodium hydrogen sulfite, sodium thiosulfate, sodium formaldehyde sulfoxylate and bi-valent iron salts as redox systems. Furthermore, peracetic acid, azodiisobutyric acid and other water-soluble per acids can be used as initiators. The pH-value of the dispersion is advantageously adjusted in the appropriate manner to between 3 and 7 by adding buffer substances such as sodium bicarbonate, alkaliphosphate, borax and the like.

When the auxiliary agents of the invention are used for the polymerization, easily pourable homogeneous dispersions are obtained, having a broad distribution of the size of the latex particles between about 0.5 and $5\mu$. Even when stored for a period of longer than one year, the dispersions of the invention do not display any change in their characteristics. Neither do they show, after repeated freezing and thawing, any change worth mentioning of their viscosity and they remain easily spreadable. In general, they possess a satisfactory electrolytic tolerance and an excellent pigment-handing ability. The dispersions of the invention, after having been dried, form hard, very clear films with a good surface luster. Since the hydroxy-lower-alkyl ethers of galactomannans, used according to the invention, are very compatible with the resin particles, no separation of the dispersion can be observed during the development of the film.

According to well known methods, the dispersions of the invention can be admixed with the usual plasticizers and fillers. In this way valuable adhesives, for example for gluing fibrous materials such as paper, cardboard, wood or other porous materials such as ceramic, can be obtained. Moreover, they can also be utilized as paints whose films possess a marked resistance to water. Lastly, these dispersions are also suitable for impregnation of textiles and fleeces and for coating paper and cardboard.

The following examples are illustrative of the invention. They are not, however, to be construed as limiting the same in any manner.

EXAMPLE I

A solution of 6 gm. of polyvinylalcohol (saponification No. 140; 25 cp. in 4% aqueous solution according to Hoppler) in 290 cc. of water was placed in a glass flask of 1 liter capacity and provided with stirrer, reflux condenser and gas inlet tube. Under stirring, 3 gm. of hydroxy ethyl guar (1640 cp. in a 2% solution according to Brookfield No. 6 spindle and 20 r.p.m.; content of primary OH groups of the hydroxyethyl groups, 12.2%) were dissolved at 50° C. Next, 1.2 gm. of allylalcohol were added to the solution, air was replaced by nitrogen, and 14.5 gm. of vinyl acetate as well as a solution of 0.9 gm. of potassium persulfate and 0.06 gm. of sodium sulfite in a small amount of water were added. The reaction mixture was slowly heated to 75° C., and after the polymerization had started, an aqueous solution of 0.48 gm. of sodium hydrogen carbonate was added thereto. Over a period of 2 hours, 273.5 gm. of vinyl acetate were introduced into the reaction mixture. Thereafter, 0.3 gm. of potassium persulfate in a small amount of water was added to the reaction mixture, which was then heated at 90° C., until no further monomer reflux could be observed. Next, under slow stirring, the reaction mixture was cooled to 25° C. The amount of water used was measured so, that altogether 300 cc. of water were used.

An easily pourable homogeneous dispersion, having a solids content of 50%, was obtained, which had a viscosity of 5000 cp. (Epprecht) and a K-value of 62. The content of residual monomer was below 0.3%. The dispersion was stored for a period of 12 months, during which time no sedimentation occurred. After freezing the dispersion three times at —18° C. and subsequent thawing, no changes of the properties were apparent.

The size of the latex particles was between 0.5 and $5\mu$, in particular between 1 and $3\mu$. The electrolytic tolerance of the dispersion was very satisfactory.

EXAMPLE II 7.15 kg. of a 7% aqueous solution of polyvinylalcohol (as in Example I) were placed in a reaction vessel equipped with stirrer, reflux condenser, thermometer and gas inlet valve. After adding 14.6 kg. of water, 250 gm. of hydroxyethyl guar (as in Example I) were dissolved in this liquor under stirring and heating to 50° C. After the addition of 150 gm. of allylalcohol and after expelling the air with the aid of nitrogen, a mixture of 1.2 kg. of vinyl acetate and 1.2 gm. of diallyl phthalate was introduced, under stirring, into the solution. Thereafter, 2.56 liter of a 3.1% aqueous potassium persulfate solution and 5 gm. of sodium sulfite dissolved in 300 cc. of water were added. Next, the reaction mixture was slowly and under stirring heated to 75° C. After the polymerization had started, a solution of 40 gm. of sodium hydrogen carbonate in 460 cc. of water was added. Within the next 1½ hours, a mixture of 22.83 kg. of vinyl acetate and 23 gm. of diallylphthalate was introduced into the reaction mixture. During this period of time, 480 ml. of a 3.1% aqueous solution of potassium persulfate were added dropwise to the reaction mixture. After the addition of the monomers was completed, 160 cc. of a 3.1% solution of potassium persulfate were added, and the reaction mixture was heated at 90° C. until the reflux was ended. The dispersion was thereafter cooled to 25° C. under slow stirring.

An easily pourable, creamy dispersion was thus obtained having a 50% solids content. According to Epprecht, the dispersion had a viscosity of 8500 cp. and a K-value of 59. The residual monomeric content was below 0.3%. After drying, a clear, glossy film was obtained from the dispersion. The dispersion was stored longer than ½ year without showing any change, and after freezing three times at −18° C., and with subsequent thawing, no changes in the characteristics of the dispersion were observed. The size of the latex particles was between 0.5 and 4μ, in particular between 1 and 3μ. The dispersion can be utilized for the preparation of glues for woods.

The preceding specific embodiments are illustrative of the practice of the invention. It is to be understood however, that other expedients known to those skilled in the art can be employed without departing from the spirit of the invention.

We claim:

1. A process for the production of a suitable polyvinyl ester dispersion which consists essentially of polymerizing an aqueous dispersion of monomers containing at least 90% of vinyl esters of alkanoic acids having from 2 to 4 carbon atoms, said aqueous dispersion containing from about 30% to 60% of said monomers, in the presence of (1) from about 0.2% to about 1.5% by weight, based on the total weight of the reaction mixture of hydroxy-lower-alkyl ethers of galactomannans, (2) a water-soluble free-radical polymerization catalyst, and (3) small amounts of polyvinyl alcohol, at a temperature of from about 10° C. to 100° C. for a time sufficient to effect polymerization and recovering said stable polyvinyl ester dispersion.

2. The process of claim 1 wherein said hydroxy-lower-alkyl ethers of galactomannans are selected from the group consisting of hydroxyethyl ethers of galactomannans, hydroxypropyl ethers of galactomannans and mixtures thereof.

3. The process of claim 1 wherein said hydroxy-lower-alkyl ethers of galactomannans are utilized in an amount of about 0.4% to about 1.0% by weight, based on the total weight of the polymerization reaction mixture.

4. The process of claim 1 wherein said vinyl ester of alkanoic acids having from 2 to 4 carbon atoms is vinyl acetate.

5. The aqueous dispersion of polyvinyl esters of alkanoic acids having from 2 to 4 carbon atoms produced by the process of claim 1.

References Cited

UNITED STATES PATENTS

| | | | |
|---|---|---|---|
| 2,998,400 | 8/1961 | French | 260—29.6 |
| 3,092,601 | 6/1963 | Sullivan et al. | 260—29.6 |
| 3,010,929 | 11/1961 | Jones | 260—29.6 |
| 3,300,473 | 1/1967 | Christoffel et al. | 260—209 |
| 3,326,890 | 6/1967 | Engelskirchen et al. | 260—209 |
| 3,350,386 | 10/1967 | Engelskirchen et al. | 260—209 |

OTHER REFERENCES

Becher, "Emulsions; Theory and Practice," pp. 184–185, Reinhold Publishing 1957.

WILLIAM H. SHORT, Primary Examiner

E. H. NIELSEN, Assistant Examiner

U.S. Cl. X.R.

260—29.6

UNITED STATES PATENT OFFICE
CERTIFICATE OF CORRECTION

Patent No. 3,551,366  Dated December 29, 1970

Inventor(s) Joachim Galinke et al.

It is certified that error appears in the above-identified patent and that said Letters Patent are hereby corrected as shown below:

Column 3, line 35, "of" should read -- at --. Column 5, line 11, "suitable" should read -- stable --.

Signed and sealed this 13th day of July 1971.

(SEAL)
Attest:

EDWARD M. FLETCHER, JR.  WILLIAM E. SCHUYLER, JR.
Attesting Officer  Commissioner of Patents